(12) United States Patent
Kazuyoshi

(10) Patent No.: US 7,800,728 B2
(45) Date of Patent: Sep. 21, 2010

(54) LIQUID CRYSTAL DISPLAY AND METHOD OF MANUFACTURING THE SAME

(75) Inventor: Nagayama Kazuyoshi, Kanagawa-ken (JP)

(73) Assignee: LG. Display Co., Ltd., Seoul (KR)

( * ) Notice: Subject to any disclaimer, the term of this patent is extended or adjusted under 35 U.S.C. 154(b) by 160 days.

(21) Appl. No.: 11/640,447

(22) Filed: Dec. 15, 2006

(65) Prior Publication Data

US 2007/0153200 A1 Jul. 5, 2007

(30) Foreign Application Priority Data

Dec. 28, 2005 (JP) ............................... 2005-37922

(51) Int. Cl.
*G02F 1/1341* (2006.01)
(52) U.S. Cl. ....................... 349/142; 349/129
(58) Field of Classification Search ................. 349/129, 349/142
See application file for complete search history.

(56) References Cited

U.S. PATENT DOCUMENTS 6,407,791 B1 * 6/2002 Suzuki et al. ............... 349/129

* cited by examiner

*Primary Examiner*—Jerry T Rahll
(74) *Attorney, Agent, or Firm*—Brinks Hofer Gilson & Lione

(57) ABSTRACT

A liquid crystal display, the viewing angle of which is controllable in the vertical and horizontal directions is disclosed. A vertical alignment type liquid crystal display has a display screen including a plurality of pixels. Each pixel includes a display control region in which the liquid crystal molecules are controlled in alignment such that the liquid crystal molecules are inclined in the incline direction, and a viewing angle control region in which the liquid crystal molecules are controlled in alignment such that the liquid crystal molecules are inclined in the vertical direction or in the horizontal direction, and control voltage is applied through a common line common to the display control region.

4 Claims, 13 Drawing Sheets

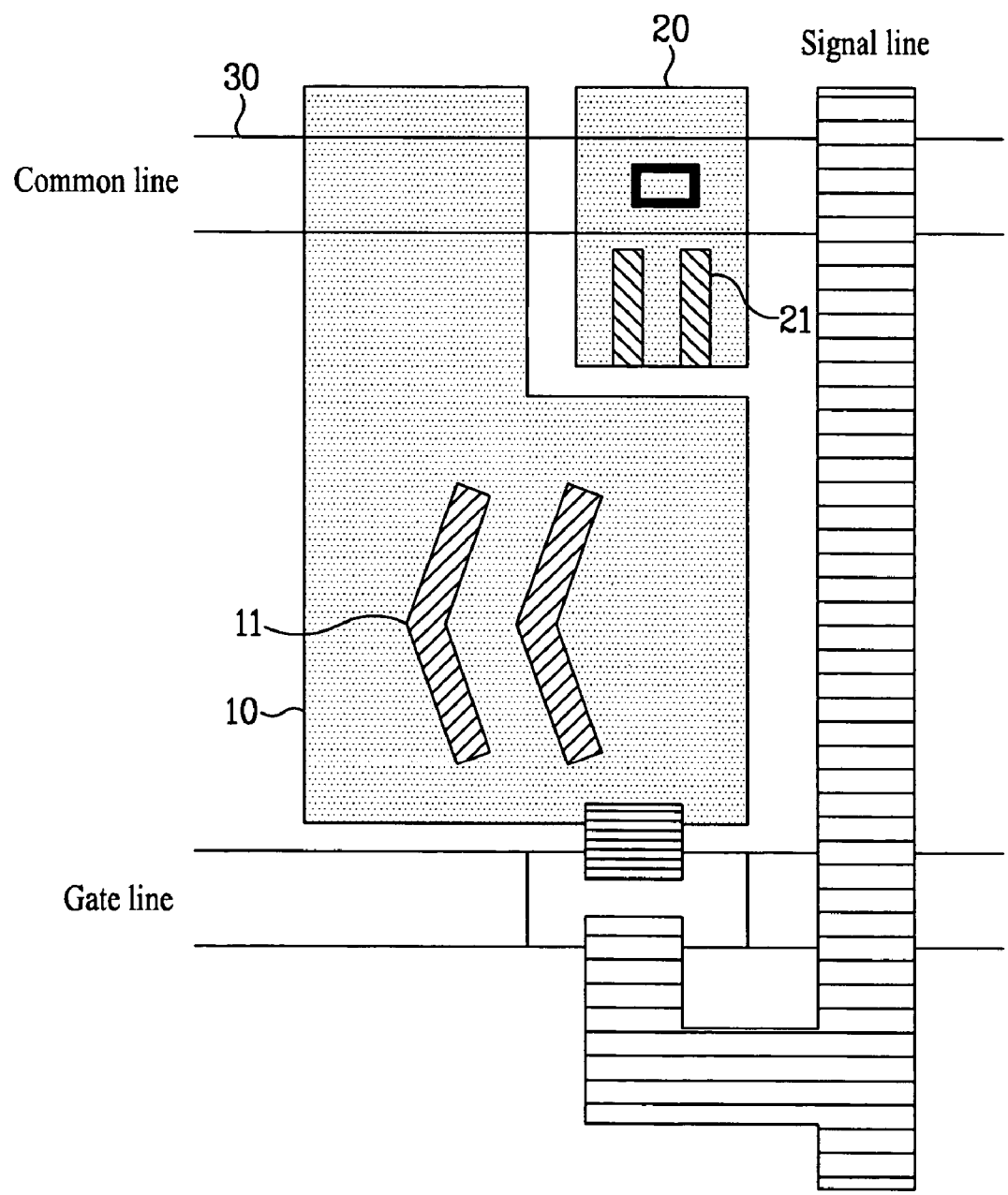

Case of black picture

- Bank at CF side
- Pixel electrode

Case of white picture

- Bank at CF side
- Pixel electrode

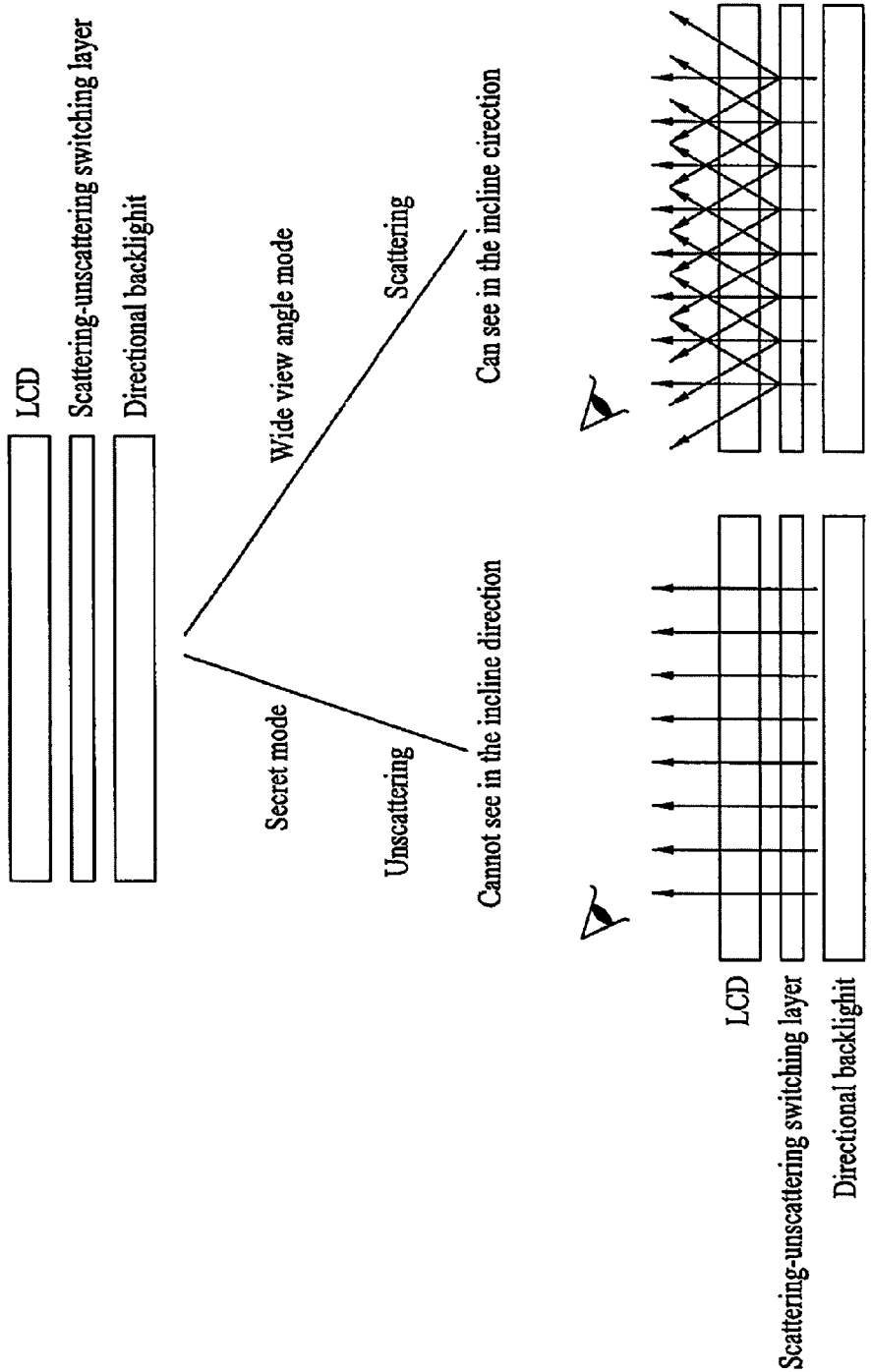

When no voltage is applied

When voltage is applied

When no voltage is applied

When voltage is applied

Case of black pixel

Case of white pixel

LIQUID CRYSTAL DISPLAY AND METHOD OF MANUFACTURING THE SAME

This application claims the benefit of Japanese Patent Application No. 2005-37922, filed on Dec. 28, 2005, which is hereby incorporated by reference as if fully set forth herein.

TECHNICAL FIELD

The present application relates to a liquid crystal display, the viewing angle of which is controllable, and a method of manufacturing the same.

BACKGROUND

Liquid crystal displays, especially, liquid crystal displays having thin film transistors (TFT) have been widely used as displays in various applications from mobile phones to large-sized televisions.

One use is in a personal display device, the display screen of which is required to be seen by a user of the personal display device, but not to be seen by other persons who view the personal display device from the side thereof.

The personal display device can be constructed such that the display screen of the personal display device can be viewed by a large number of persons, or the display screen can be exclusively used by only one individual, as occasion demands.

FIG. 7 is a view illustrating a conventional liquid crystal display having a "secret" mode. (for example, Japanese Unexamined Publication No. 5-72529). A backlight for emitting light to a liquid crystal panel from the rear side has high directionality.

Between the common liquid crystal panel and the directional backlight another liquid crystal panel is disposed for switching between a scattered light state and an unscattered light state. This liquid crystal panel may be, for example, a polymer-type liquid crystal panel (a scattering-unscattering switching panel).

When the scattering-unscattering switching layer is in an unscattered state, light from the backlight is emitted to the front direction only, and therefore, it is not possible to see the display from the side.

When the scattering-unscattering switching layer is in a scattered state, on the other hand, light from the backlight is emitted in the inclined directions, and therefore, it is possible to see the display from a side thereof. Consequently, a large number of persons can view the display.

To provide the secret mode of operation, it is necessary to manufacture a special liquid crystal panel different from the common liquid crystal panel, and therefore, the manufacturing costs are increased.

In order to solve this problem, another method has been proposed using a vertical-alignment-type liquid crystal display. FIGS. 8A and 8B are views respectively illustrating the shape of a liquid crystal molecule when viewing the vertical alignment type liquid crystal display from the front.

In a state that the voltage is not applied, as shown in FIG. 8A, the liquid crystal molecule is aligned vertically. When the voltage is applied as shown in FIG. 8B, the liquid crystal molecule is inclined in an orthogonal state.

A polarizer and an analyzer are directed with their absorption axes in the vertical direction and in the horizontal direction, respectively.

FIG. 8A illustrates a state where the vertically aligned liquid crystal panel, to which the voltage in not applied, is viewed from the front. Double refraction of the liquid crystal molecule does not occur, and light does not leak.

FIG. 8B illustrates a state where the vertically aligned liquid crystal panel, to which the voltage in applied, is viewed from the front. The optical axis of the liquid crystal molecule is in parallel with the absorption axis of the polarizer. Double refraction of the liquid crystal molecule does not occur, and light does not leak.

FIGS. 9A and 9B are views illustrating the shape of a liquid crystal molecule when viewing the vertical alignment type-liquid crystal display from the side at an angle to the front of the liquid crystal display.

When the voltage is not applied, as shown in FIG. 9A, the axis of the liquid crystal molecule is parallel with the absorption axis of the analyzer, and therefore, light does not leak.

When the voltage is applied, as shown in FIG. 9B, the axis of the liquid crystal molecule is offset from the axis of the polarizer or the axis of the analyzer. Consequently, double refraction of the liquid crystal molecule occurs, and light leaks.

When the light leakage phenomenon is used, the display contrast is lowered in the horizontal direction. As a result, it is not possible to recognize what is displayed even when the display is seen from a horizontal angle. Consequently, it is possible to control the confidentiality of the display using this light leakage phenomenon.

FIG. 10 is a view illustrating the specific construction for controlling the confidentiality of the display, where a single pixel includes sub-pixels of red, green and blue (RGB) and a sub-pixel of white (W).

FIG. 11 is a view illustrating the arrangement of liquid crystal molecules of the respective sub-pixels shown in FIG. 10. As shown in FIG. 11, the alignment state of the liquid crystal molecules in the white sub-pixel is quite different from the alignment state of the liquid crystal molecules in the RGB sub-pixels. Specifically, the liquid crystal molecules are aligned upward and downward in the white sub-pixel.

Consequently, when the voltage is not applied to the white sub-pixel, the white sub-pixel does not contribute to the display, and therefore, a normal display can be realized.

When the voltage is applied to the white sub-pixel, on the other hand, a white display is performed at the front in the horizontal direction. As a result, the contrast of the display is lowered in the horizontal viewing angle direction, and therefore, it is difficult for other people to view the display.

FIG. 12 is a plan view illustrating an enlarged pixel of the conventional vertical alignment type liquid crystal display, and FIG. 13 is a sectional view illustrating the enlarged pixel of the conventional vertical alignment type liquid crystal display.

FIGS. 14A and 14B are views illustrating the operation of liquid crystal molecules with the application of a voltage in the conventional vertical alignment type liquid crystal display.

A (chevron) "<"-shaped common electrode for controlling the liquid crystal inclination direction is formed on a transparent electrode at a color filter (CF) side (see FIGS. 12 and 13).

When the voltage is not applied, the liquid crystal molecules are oriented in the vertical direction, as shown in FIG. 14A.

When the voltage is applied, the liquid crystal molecules are inclined in the a prescribed direction by the common electrode due to the effect of the inclined electric field, i.e., the direction perpendicular to the spreading direction of the common electrode, as shown in FIG. 14B.

As a result, the inclination of the liquid crystal in two directions corresponding to the "<" shape is possible, and a liquid crystal display having a good viewing angle is realized.

However, the conventional liquid crystal display has the following problems.

First, the conventional liquid crystal display is constructed such that a white sub-pixel is formed; however, it is necessary to form a white resin, and the driving operation of the white sub-pixel is different from the conventional art.

Second, the contrast is lowered in the horizontal orientation; however, the contrast is not lowered in the vertical orientation.

SUMMARY

A vertical-alignment-type liquid crystal display (LCD) has a display screen including a plurality of pixels, and each pixel includes a display control region in which the orientation of liquid crystal molecules is controlled such that the liquid crystal molecules are inclined in an incline orientation, and a viewing angle control region in which the orientation of liquid crystal molecules is controlled such that the liquid crystal molecules are inclined in a vertical orientation or in a horizontal orientation, and control voltage is applied through a common line common to the display control region and the viewing angle control region of a pixel.

In another aspect, a method of manufacturing a liquid crystal display includes forming a gate electrode, a gate pad, and a data pad on a substrate; forming a gate insulation film and forming a source electrode and a drain electrode on the gate electrode; forming a passivation layer on the front of the substrate and forming contact holes; forming a pixel electrode in a display control region in which the orientation of liquid crystal molecules is controlled such that the liquid crystal molecules are inclined in an incline orientation. The step of forming the pixel electrode includes forming a viewing angle control electrode in a viewing angle control region, in which the orientation of liquid crystal molecules is controlled such that the liquid crystal molecules are inclined in the vertical orientation or in the horizontal orientation, and control voltage is applied through a common line common to the display control region.

BRIEF DESCRIPTION OF THE DRAWINGS

The accompanying drawings, which are included to provide a further understanding of the invention are incorporated in and constitute a part of this application. In the drawings:

FIG. 2 is another plan view illustrating the enlarged pixel of the liquid crystal display;

FIG. 7 is a view illustrating a conventional liquid crystal display having a "secret" mode;

DETAILED DESCRIPTION

Reference will now be made in detail to examples which are illustrated in the accompanying drawings. Wherever possible, the same reference numbers will be used throughout the drawings to refer to the same or like parts.

Figure 1:
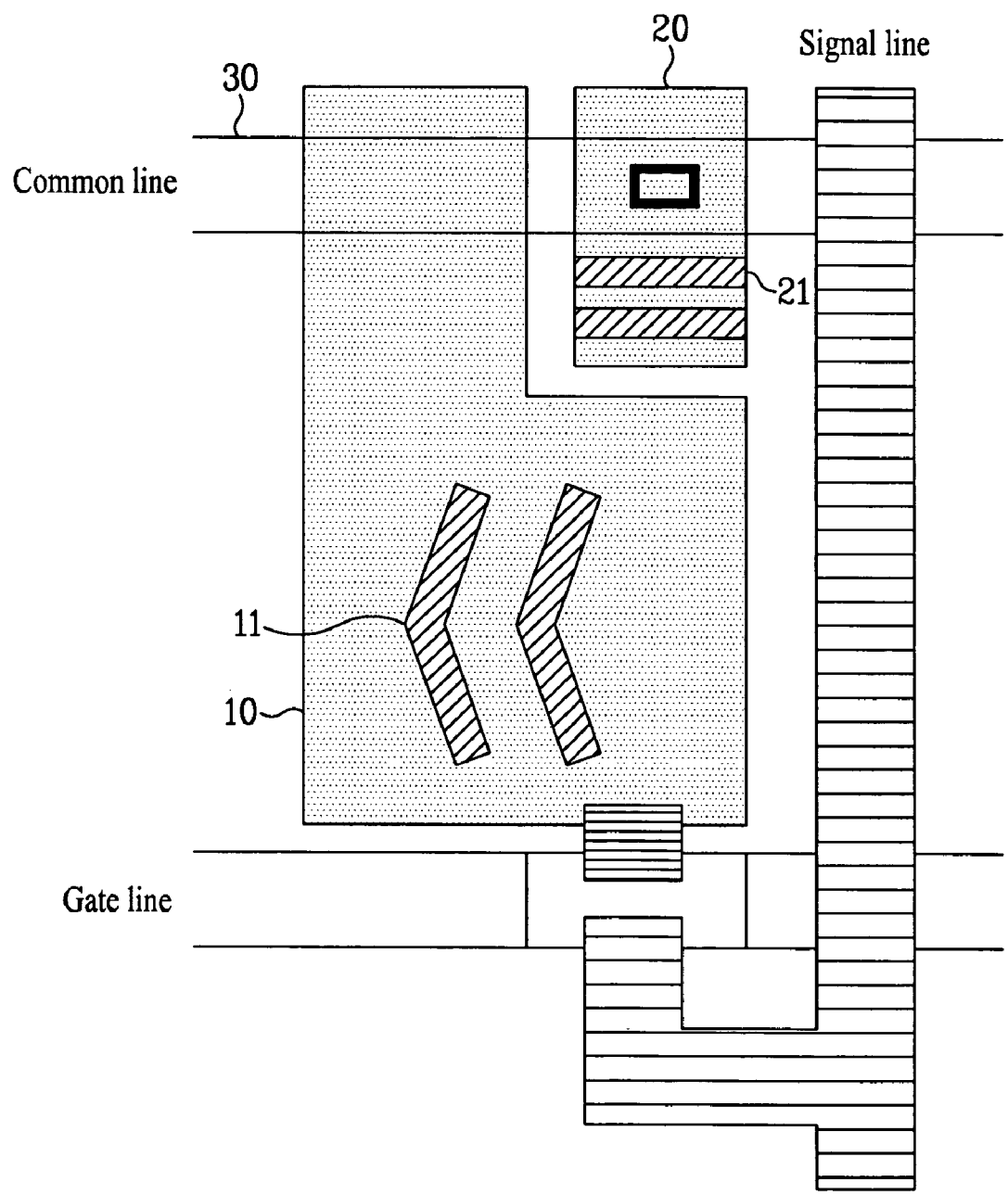
FIG. 1 is a plan view illustrating an enlarged pixel of a liquid crystal display.

FIG. 1 is a plan view illustrating an enlarged pixel of a liquid crystal display. A pixel includes a display control region 10 and a viewing angle control region 20.

The display control region 10 is a region in which the liquid crystal molecules are controlled in alignment such that the liquid crystal molecules are inclined in the incline direction. In the display control region 10 "<"-shaped banks (or slits) 11 are formed.

The viewing angle control region 20 is a region in which the liquid crystal molecules are controlled in alignment such that the liquid crystal molecules are inclined in the vertical direction or in the horizontal direction, and the control voltage is applied through a common line 30 common to the display control region 10 and the viewing angle control region 20. As shown in FIG. 1, banks (or slits) 21 are formed in the viewing angle control region 20 in the horizontal direction.

FIG. 2 is another plan view illustrating the enlarged pixel of the liquid crystal display. As shown in FIG. 2, the banks 21 are formed in the viewing angle control region 20 in the vertical direction.

A part including pixels having the viewing angle control region 20 in which the banks 21 are arranged in the horizontal direction as shown in FIG. 1 will be referred to as an "A pattern."

Similarly, a part including pixels having the viewing angle control region 20 in which the banks 21 are arranged in the vertical direction as shown in FIG. 2 will be referred to as a "B pattern."

For example, a display screen formed by approximately 1000×1000 pixels may be divided into an A pattern region and a B pattern region.

As shown in FIGS. 1 and 2, a voltage may be applied to the display control region 10 through the common signal line 30. The voltage is also applied to the viewing angle control region 20 through the common line 30. An aperture ratio is increased by sharing the common line 30.

Figure 3A:
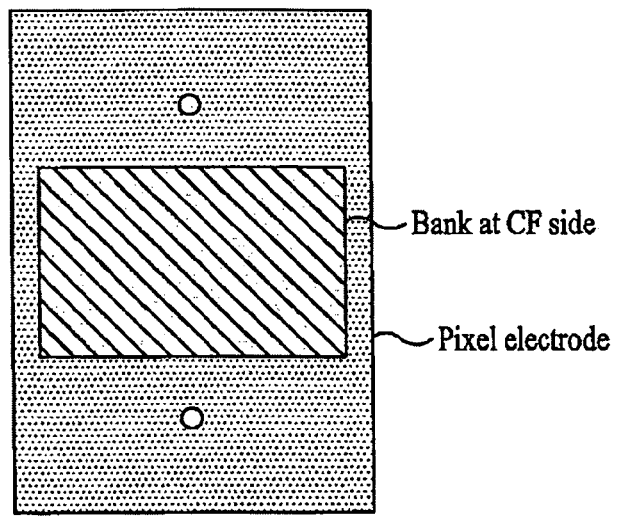
FIGS. 3A and 3B are views illustrating the operation of liquid crystal molecules in a viewing angle control region.
Figure 3B:
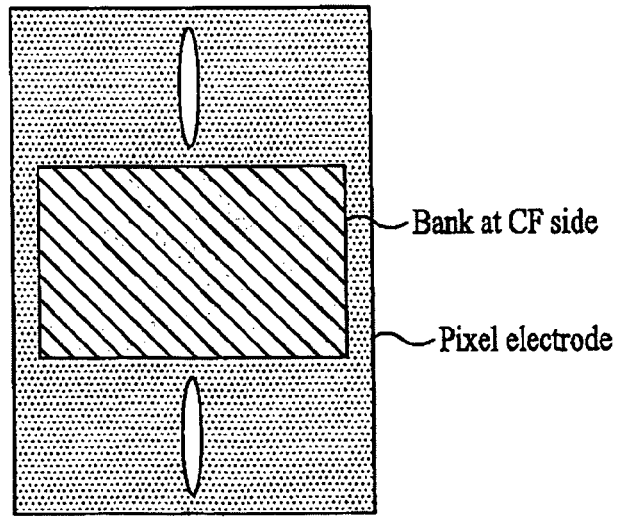

FIGS. 3A and 3B are views illustrating the operation of liquid crystal molecules in the viewing angle control region 20 having the A pattern in the liquid crystal display.

When the voltage is not applied to the viewing angle control region 20 having the A pattern, the liquid crystal molecules are positioned in the horizontal state, as shown in FIG. 3A. As a result, the display in the viewing angle control region 20 becomes black, but the whole display is not affected. This is occurs in the front viewing angle, the vertical and horizontal viewing angles, and the inclined viewing angle. The RGB sub-pixels of the pixel are controlled as is known in the art.

When a voltage is applied to the viewing angle control region 20 having the A pattern, on the other hand, the liquid crystal molecules are inclined in a predetermined direction due to the effect of the inclined electric field by the banks 21: e.g., the direction perpendicular to the spreading direction of the banks 21, as shown in FIG. 3B.

Consequently, when the viewing angle control region 20 is viewed in the horizontal direction, bright light is transmitted through the part having the horizontal banks 21. On the other hand, when the viewing angle control region 20 is viewed in the vertical direction, light is not transmitted through the part having the horizontal banks 21.

When the voltage is applied to the viewing angle control region 20 having the B pattern, the liquid crystal molecules are inclined in the direction 90 degrees displaced from the direction shown in FIG. 3B. Consequently, when the viewing angle control region 20 is viewed in the horizontal direction, light is not transmitted through the part having the vertical banks 21.

When the viewing angle control region 20 is viewed in the vertical direction, on the other hand, bright light is transmitted through the part having the vertical banks 21.

As a result, when the voltage is applied to the viewing angle control region 20, the viewing angle control region having the A pattern is perceived as white in the horizontal viewing angle, whereas the viewing angle control region having the B pattern is perceived as black in the horizontal viewing angle.

On the other hand, the viewing angle control region having the A pattern is perceived as black in the vertical viewing angle, whereas the viewing angle control region having the B pattern is perceived as white in the vertical viewing angle.

These patterns are overlapped with the common display pattern of the display control region 10. Consequently, when the patterns are viewed in the horizontal and vertical direction, it is not possible to recognize what is written.

As described above, it is possible to brighten the display in the horizontal direction by applying the voltage to the viewing angle control region 20 in the case of the pixels having the A pattern, and it is possible to brighten the display in the vertical direction by applying the voltage to the viewing angle control region 20 in the case of the pixels having the B pattern.

Consequently, it is possible to accomplish a display having desired confidentiality by disposing the A pattern region and the B pattern region at desired positions in the display screen.

Figure 4:
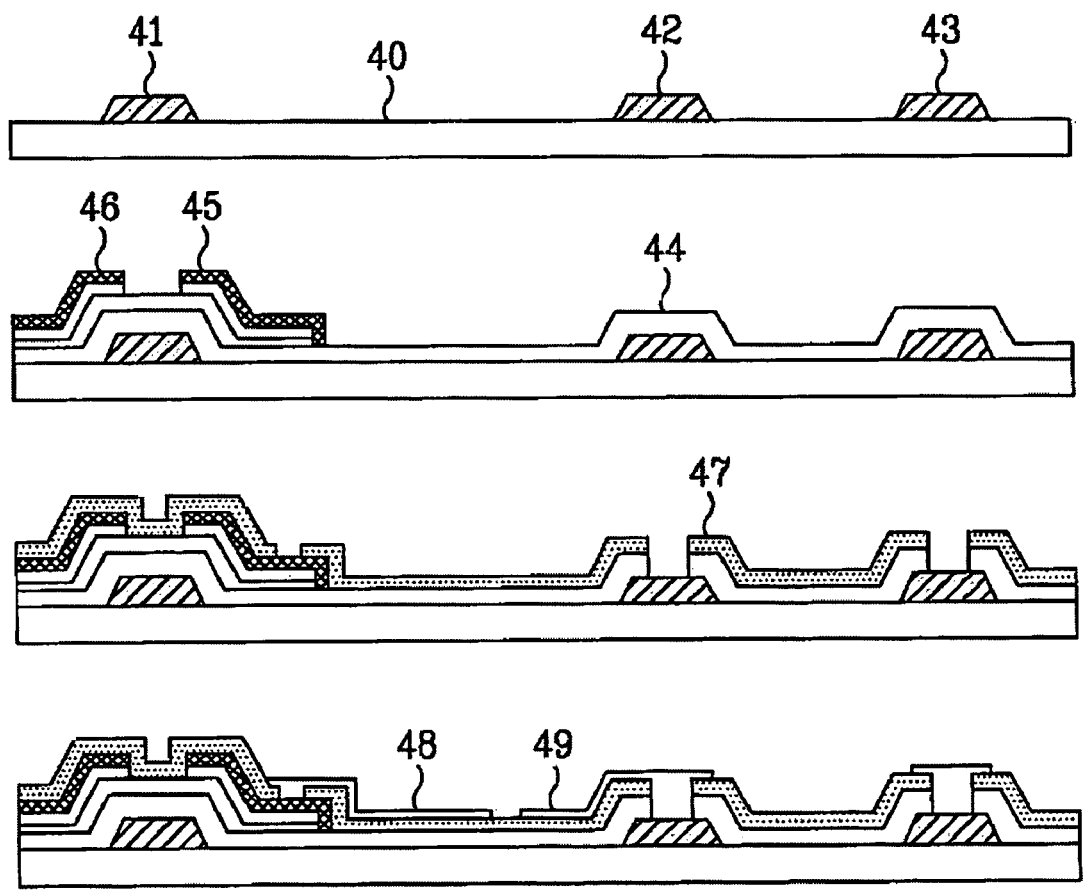
FIG. 4 is a view illustrating a method of manufacturing a liquid crystal display.

FIG. 4 is a view illustrating a method of manufacturing a liquid crystal display having confidentiality properties.

A gate electrode 41, a gate pad 42, and a data pad 43 are formed on a substrate 40.

Subsequently, a gate insulation film 44 is formed, and then an a-Si layer and an N+ a-Si layer are sequentially formed. A metal layer is formed on the N+ a-Si layer, and holes are formed by etching. A source electrode 45 and a drain electrode 46 are formed on the gate electrode 41.

Then, a passivation layer 47 is formed on the substrate 40, and contact holes are formed.

A pixel electrode 48 is formed in a display control region 10, in which the liquid crystal molecules are controlled in alignment such that the liquid crystal molecules are controllable in the incline direction, and a viewing angle control electrode 49 is further formed in a viewing angle control region 20 in which the liquid crystal molecules are controllable in alignment such that the liquid crystal molecules are inclined in the vertical direction and in the horizontal direction, and a control voltage is applied through the common line 30.

It is also possible to fill the viewing angle control region 20 using a 4-mask process similar to a conventional process by the provision of a mask in the fourth operation.

Figure 5:
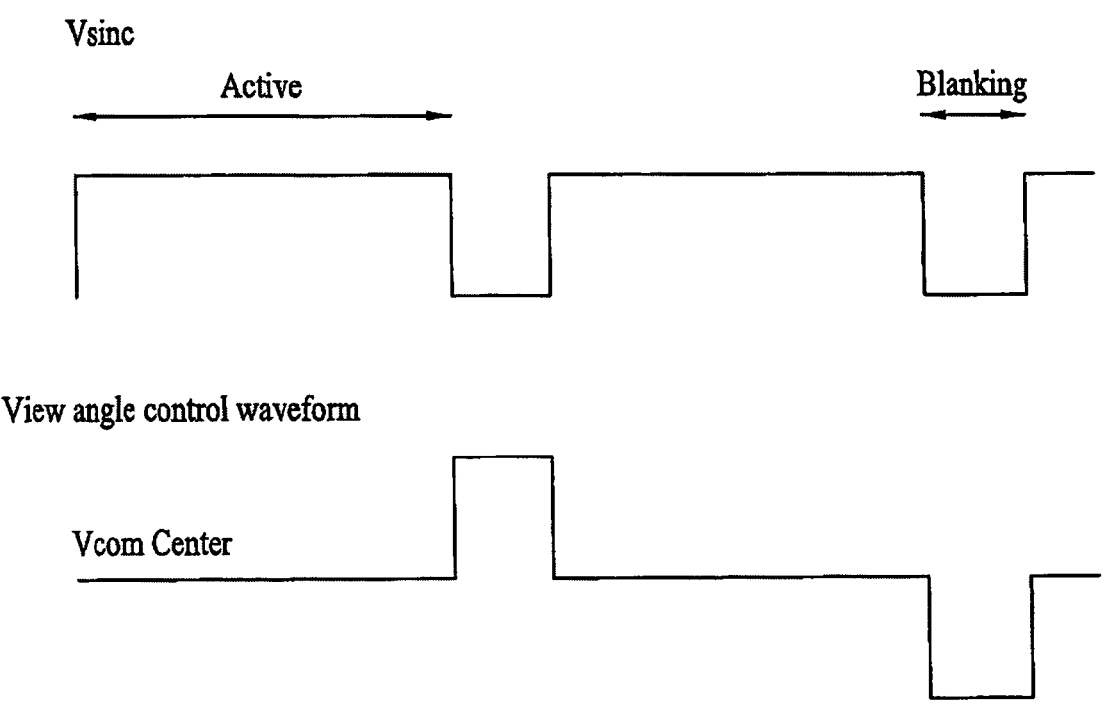
FIG. 5 is a view illustrating the waveform of an applied voltage in the liquid crystal display.

FIG. 5 is a view illustrating the waveform of applied voltage in the liquid crystal display.

As shown in FIGS. 1 and 2, a control voltage is applied to the display control region 10 and the viewing angle control region 20 through the common line 30. When common voltage is applied during the voltage writing of the pixel, pixel voltage is lowered. For this reason, the application of voltage to the viewing angle control region 20 is performed not during the writing of the pixel but during the blanking of Vsinc.

By controlling the timing of the applied voltage, it is possible to individually control the voltage applied to the display control region 10 and the voltage applied to the viewing angle control region 20 while jointly using the common line 30.

Figure 6:
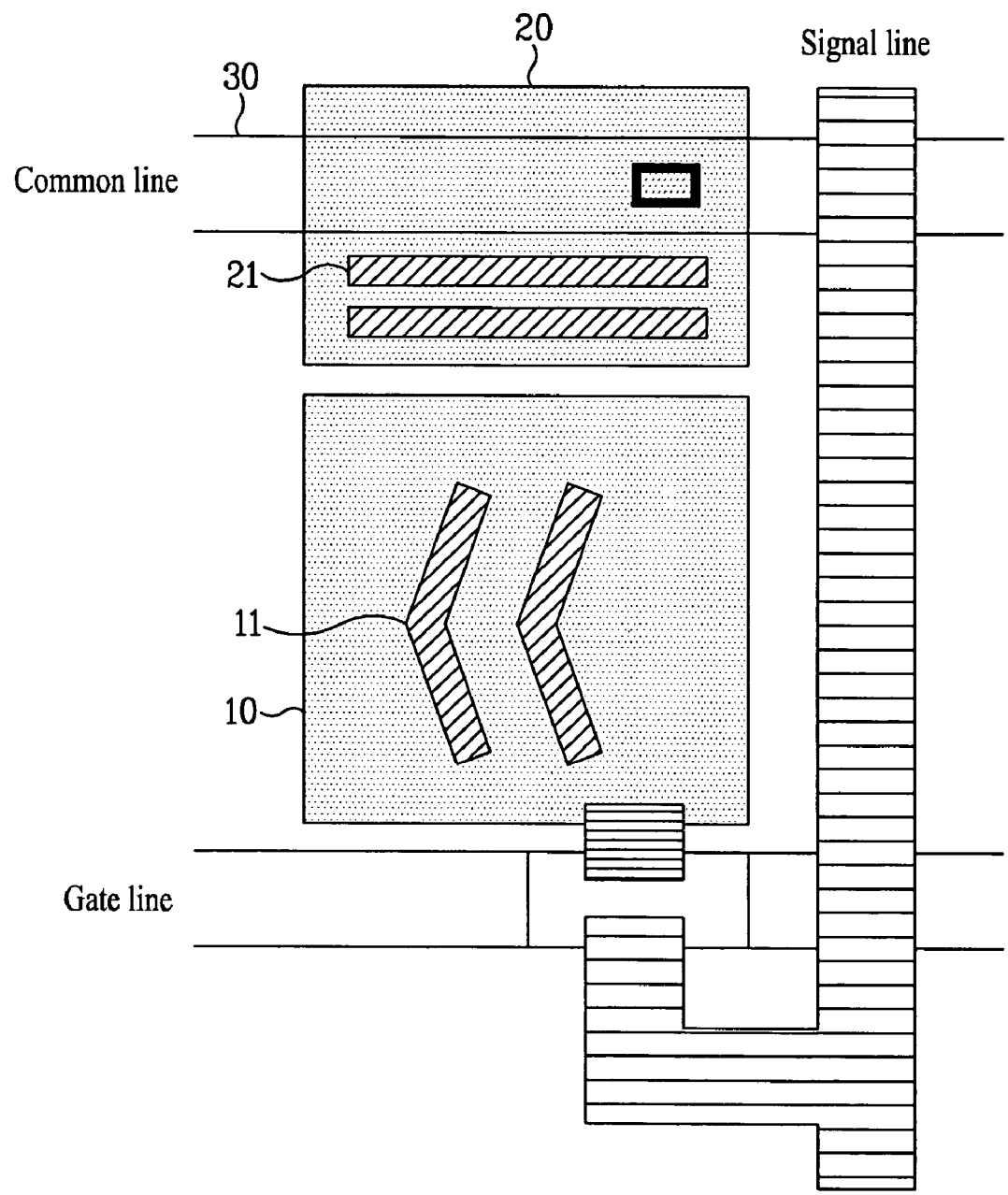
FIG. 6 is another plan view illustrating the enlarged pixel of the liquid crystal display.
Figure 8A:
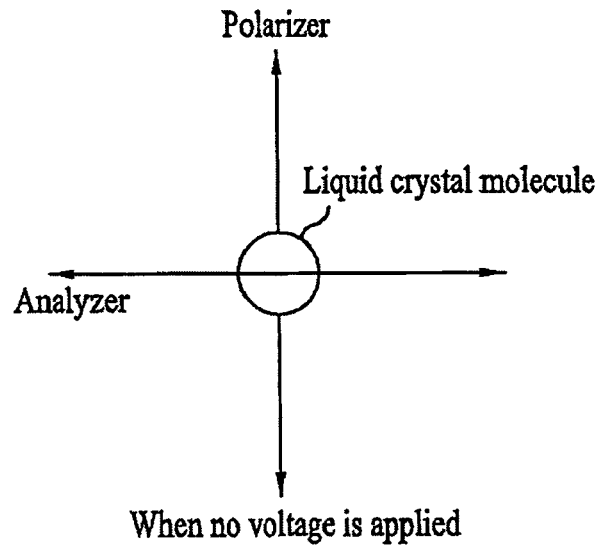
FIGS. 8A and 8B are views illustrating the shape of a liquid crystal molecule when viewing a vertical alignment type liquid crystal display from the front.
Figure 8B:
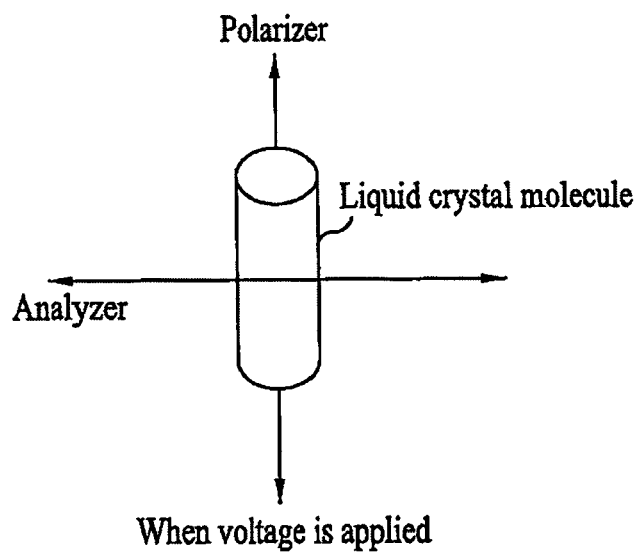
Figure 9A:
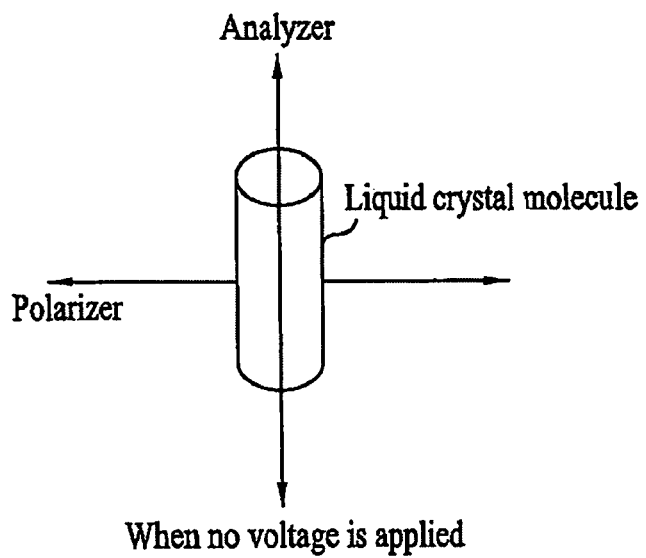
FIGS. 9A and 9B are views illustrating the shape of a liquid crystal molecule when viewing the vertical alignment type liquid crystal display from the side at an angle to the front of the liquid crystal display.
Figure 9B:
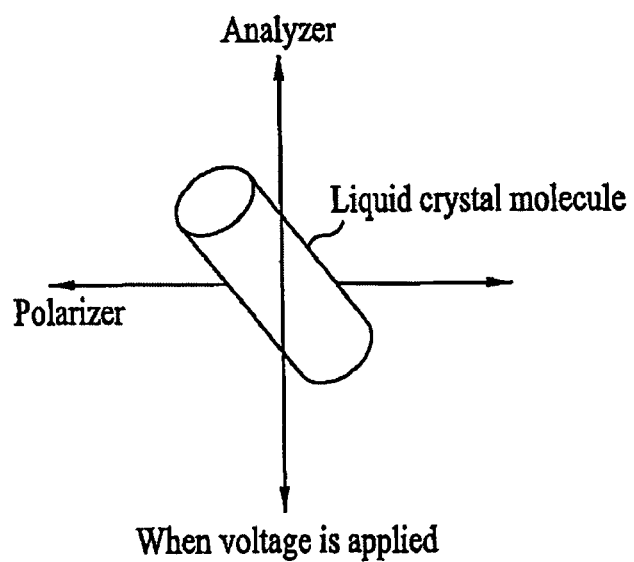
Figure 10:
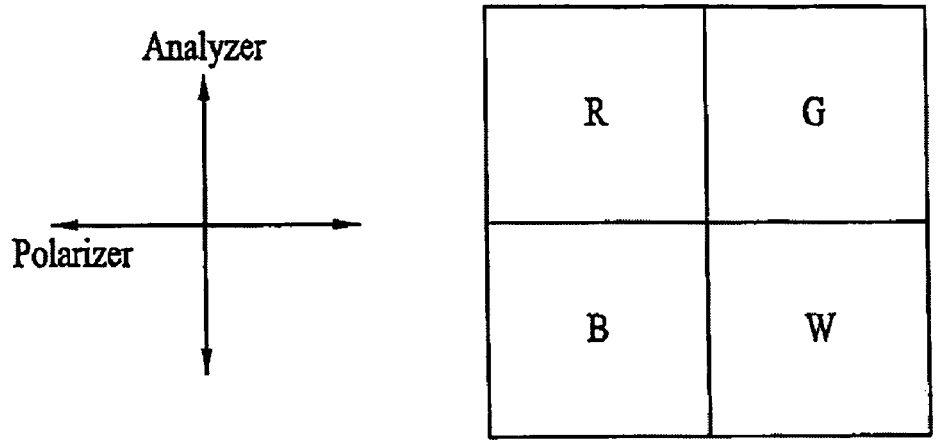
FIG. 10 is a view illustrating the construction for controlling the confidentiality of the display.
Figure 11:
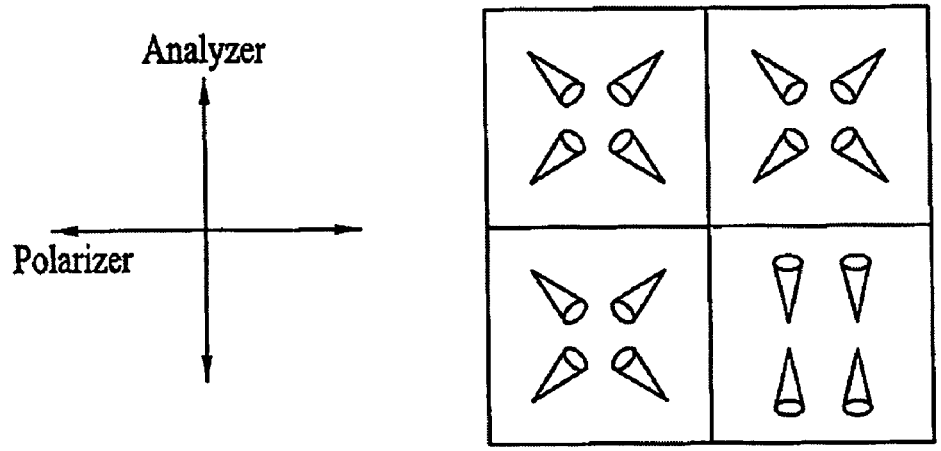
FIG. 11 is a view illustrating the arrangement of liquid crystal molecules of the respective sub-pixels shown in FIG. 10.
Figure 12:
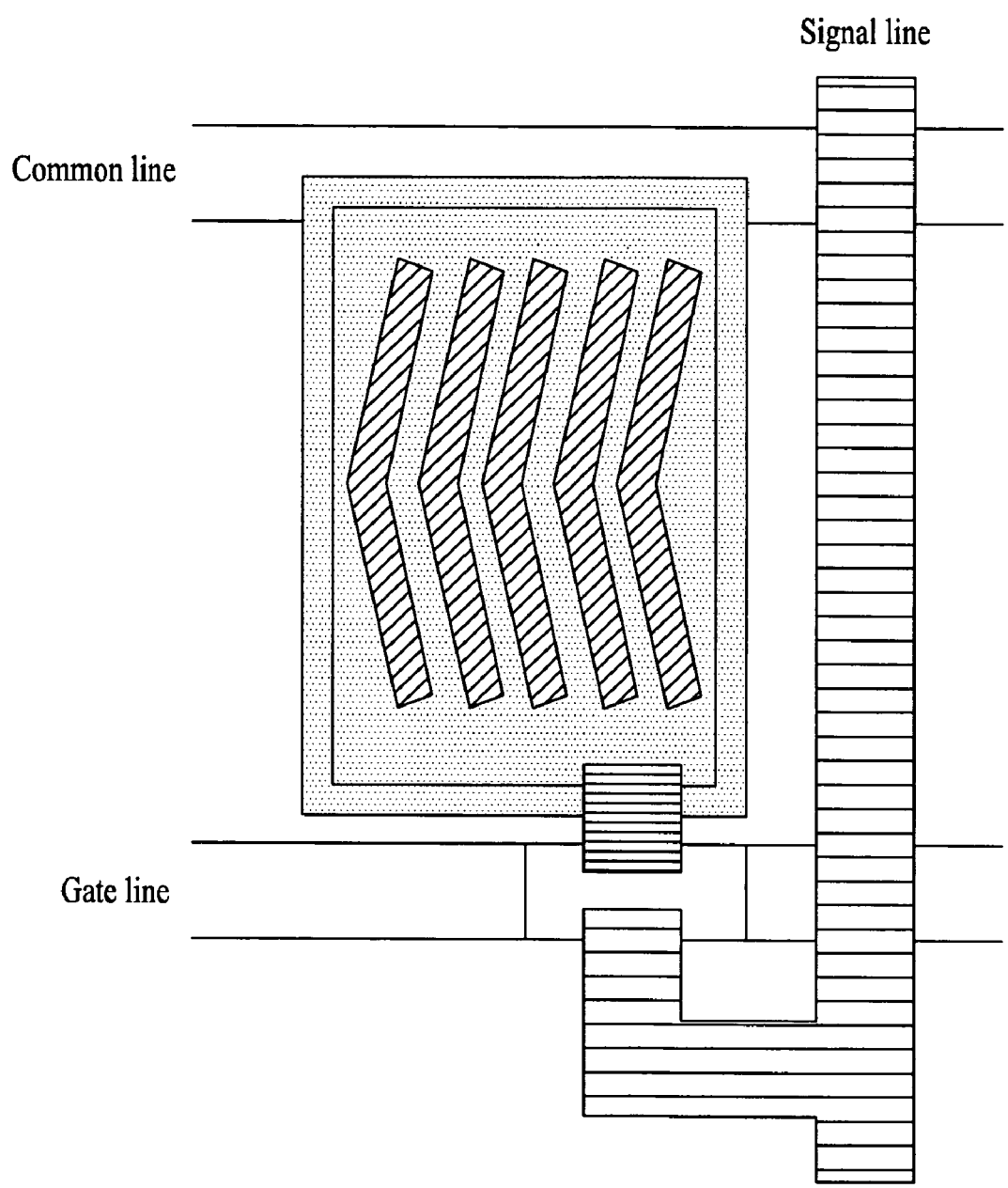
FIG. 12 is a plan view illustrating an enlarged pixel of a conventional vertical-alignment-type liquid crystal display.
Figure 13:
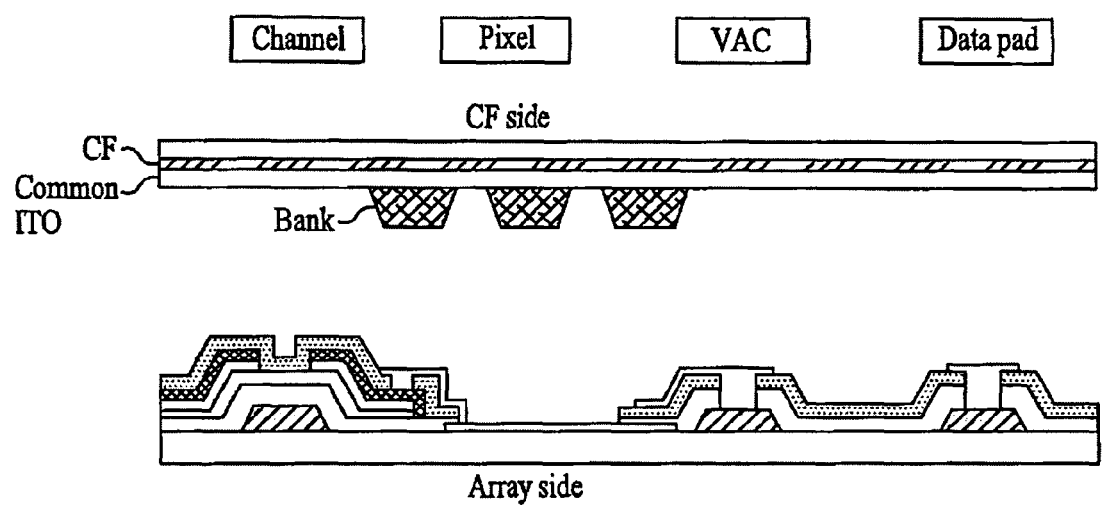
FIG. 13 is a sectional view illustrating the enlarged pixel of the conventional vertical-alignment-type liquid crystal display.
Figure 14A:
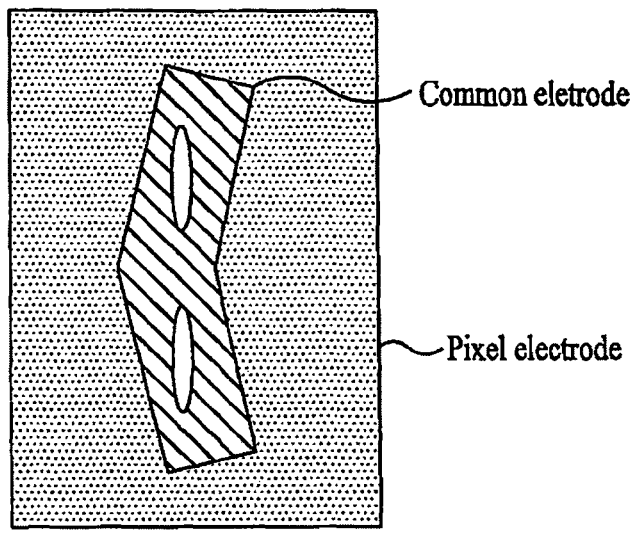
FIGS. 14A and 14B are views illustrating the operation of liquid crystal molecules due to the application of voltage in the conventional vertical-alignment-type liquid crystal display.
Figure 14B:
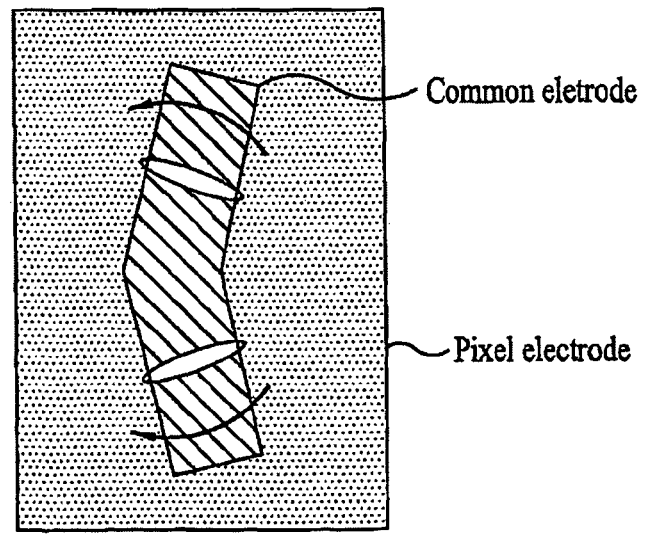

FIG. 6 is another plan view illustrating the enlarged pixel of the liquid crystal display. Since a vertical alignment type liquid crystal display has large liquid crystal capacity, the load capacity may be made to construct a display control region as shown in FIG. 6. Therefore, it is possible to form a viewing angle control region 20 having desired pattern at a desired position using the 4 mask process. Also, the viewing angle control region 20 does not directly contribute to the display of information. The viewing angle control region 20 is provided so that it is difficult to recognize the display information. Consequently, it is not necessary to form a coloring layer at a color filter substrate side opposite to the viewing angle control region 20.

It is therefore possible to provide a liquid crystal display where the viewing angle of which can be controlled in the vertical direction and the horizontal direction by forming the viewing angle control region using the conventional 4 mask process.

Also, it may be possible to increase an aperture ratio by sharing the common line common to the display control region and the viewing angle control region. At the same time, it may be possible to independently control the viewing angle control region by controlling of the timing of voltage applied to the respective regions.

Furthermore, it may be possible to realize a liquid crystal display having desired confidentiality over the entire liquid crystal panel by disposing the viewing angle control pattern in the vertical and horizontal direction at suitable positions in the display screen.

In addition, it is not necessary to form a coloring layer at the color filter substrate opposite to the viewing angle control region, and therefore, it is possible to reduce the manufacturing costs.

A liquid crystal display may be provided where the viewing angle is controllable in the vertical and horizontal directions without forming a white sub-pixel by further forming a display control region, in which the liquid crystal molecules are controlled in alignment such that the liquid crystal molecules may be inclined in the incline orientation, and a viewing angle control region, in which the liquid crystal molecules are controlled in alignment such that the liquid crystal molecules are inclined either in the vertical direction or in the horizontal direction, and the control voltage is applied through the common line common to the display control region and the viewing angle control region in one pixel, without adding a mask process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display having a display screen including a plurality of pixels, wherein each pixel divided into a display control region and a viewing angle control region comprises:
    a pixel electrode formed in the display control region in which an alignment of liquid crystal molecules is controllable such that the liquid crystal molecules are inclined in an incline direction to surface of a substrate;
    a viewing angle control electrode formed in the viewing angle control region where the pixel electrode and the viewing angle control electrode do not overlap to separate from the pixel electrode in the each pixel;
    a common line for supplying a control voltage to the viewing angle control electrode;
    a first structure of bank or slit shape formed in the display control region; and
    a second structure of bank or slit shape formed in the viewing angle control region and formed in one of a vertical direction or a horizontal direction to a longitudinal direction of the common line;
    wherein an alignment of liquid crystal molecules in the viewing angle control is controllable such that the liquid crystal molecules are inclined in a vertical direction to the second structure by application of the control voltage through the common line common to the display control region and the viewing angle control region.

2. The liquid crystal display according to claim 1, wherein the control voltage is applied during the pixel blanking interval.

3. The liquid crystal display according to claim 1, wherein a color filter is not formed on the substrate disposed opposite to the viewing angle control region.

4. A method of manufacturing a liquid crystal display including a plurality of pixels divided into a display control region and a viewing angle control region, the method comprising:
    forming a gate electrode, a gate pad, and a data pad on a substrate;
    forming a gate insulation film and a source electrode and a drain electrode on the gate electrode;
    forming a passivation layer on the substrate and forming contact holes in the passivation layer; and
    forming a pixel electrode in the display control region in which liquid crystal molecules are controllable in alignment such that the liquid crystal molecules are inclined in an incline direction to surface of the substrate;
    forming a viewing angle control electrode in the viewing angle control region where the pixel electrode and the viewing angle control electrode do not overlap to separate from the pixel electrode in the each pixel;
    forming a common line common to the display control region and the viewing angle control region, wherein a control voltage is supplied through the common line to the viewing angle control electrode;
    forming a first structure of bank or slit shape formed in the display control region; and
    forming a second structure of bank or slit shape formed in the viewing angle control region and formed in one of a vertical direction or a horizontal direction to a longitudinal direction of the common line;
    wherein an alignment of liquid crystal molecules in the viewing angle control is controllable such that the liquid crystal molecules are inclined in a vertical direction to the second structure by application of the control voltage through the common line.

* * * * *